United States Patent [19]
Botros et al.

[11] Patent Number: 5,498,283
[45] Date of Patent: Mar. 12, 1996

[54] WATERFAST SECURITY INKS

[75] Inventors: Raouf Botros; Sunita Chavan, both of Dayton, Ohio

[73] Assignee: Scitex Digital Printing, Inc., Dayton, Ohio

[21] Appl. No.: 294,888

[22] Filed: Aug. 23, 1994

[51] Int. Cl.⁶ .................................................. C09D 11/02
[52] U.S. Cl. ........................................ 106/22 H; 106/22 B
[58] Field of Search ............................... 106/22 B, 22 H

[56] References Cited

U.S. PATENT DOCUMENTS

| | | | |
|---|---|---|---|
| 4,255,754 | 3/1981 | Crean et al. | 346/75 |
| 4,659,382 | 4/1987 | Kang | 106/22 H |
| 4,698,123 | 10/1987 | Link et al. | 156/634 |
| 4,751,517 | 6/1988 | Crean et al. | 346/75 |
| 4,789,400 | 12/1988 | Solodar et al. | 106/20 D |
| 5,017,224 | 5/1991 | Tomita et al. | 106/20 R |
| 5,017,644 | 5/1991 | Fuller et al. | 106/22 H |
| 5,019,164 | 5/1991 | Tomita et al. | 106/20 R |
| 5,223,028 | 6/1993 | Aulick et al. | 106/22 H |
| 5,304,587 | 4/1994 | Oswald et al. | 106/21 A |

*Primary Examiner*—Helene Klemanski
*Attorney, Agent, or Firm*—Barbara Joan Haushalter

[57] ABSTRACT

An ink jet ink composition comprises a security component, a liquid vehicle, a dye, and an N-hydroxyalkyl imine substituted at about 80% of the available nitrogens. The security component in this ink jet composition causes the ink to maintain color when subjected to bleach to prevent alteration of a printed document, and can be used in ink jet printers.

12 Claims, No Drawings

WATERFAST SECURITY INKS

TECHNICAL FIELD

The present invention relates to aqueous liquid inks which are waterfast when applied and, more particularly, to waterfast inks formulated to leave a visible stain behind after the print is treated with household bleach.

BACKGROUND ART

In continuous ink jet printing, ink is supplied under pressure to a manifold region that distributes the ink to a plurality of orifices, typically arranged in a linear array(s). The ink discharges from the orifices in filaments which break into droplet streams. The approach for printing with these droplet streams is to selectively charge and deflect certain drops from their normal trajectories. Graphic reproduction is accomplished by selectively charging and deflecting drops from the drop streams and depositing at least some of the drops on a print receiving medium while other of the drops strike a drop catcher device. The continuous stream ink jet printing process is described, for example, in U.S. Pat. Nos. 4,255,754; 4,698,123 and 4,751,517, the disclosures of each of which are totally incorporated herein by reference.

In the ink jet printing art, water soluble dyes are desirable for runnability, but waterfast inks are highly desirable for producing permanent images. It is also known in the industry that a waterfast security ink is highly desired for printing important documents such as lottery tickets, checks, etc., to prevent alteration of information on such documents. Bleach is a powerful tool used to decolorize most inks since it attacks the dye molecule and oxidizes it into small colorless fragments.

Compounds such as N,N-diphenyl guanidine, which is believed to be the active component in Chlorostain BR (By Mobay Corp., Pittsburgh, Pa.), and Chlorostain OR which is also commercially available from Mobay and based on benzothiazole chemistry, are used as additives to formulate security inks.

One drawback for diphenyl guanidine and benzothiazole additives is that they are not water soluble and require the use of either potentially dangerous solvents such as methyl cellosolve and methyl carbitol, or the use of acids to dissolve them. It is well known that low pH fluids can attack Ni orifice plates and cause corrosion, which is extremely undesirable in the ink jet printing industry.

U.S. Pat. No. 5,304,587 disclosed the use of a mixture of these compounds to make secure inks. When Chlorostain OR (Benzothiazole) was used alone in 27% as demonstrated in Example 5, the ink failed the bleach security test. When both Chlorostain OR and BR were used in 27% as demonstrated in Example 4, (otherwise the rest of the ingredients remain the same in both Examples 4 and 5), the ink of Example 4 passed the bleach security test. The '587 patent, then, teaches that 27% of both Chlorostain OR and BR are needed to formulate security inks.

However, the percent solids in ink jet inks is usually kept below 10%, and preferably below 5%, to insure good runnability of the inks in the printer. Percent solids above these values raise viscosity of the ink which, in turn, adversely affects stimulation and jet straightness. It is desirable to keep viscosity of the ink below 2 Centipoise, and preferably at or below 1.5 Centipoise at ambient temperature. In addition, lower solid contents in the ink would improve redisolvability of the dried ink on the orifice plate.

It is seen then that there is a great need for inks which do not bleach out completely, but leave a visible stain behind to prevent attempts at altering of information on a document.

SUMMARY OF THE INVENTION

This need is met by the waterfast ink composition according to the present invention, which is formulated to leave a visible stain behind after the print is treated with household bleach.

In accordance with one aspect of the present invention, an ink jet ink composition comprises a security component, a liquid vehicle, a dye, and an N-hydroxyalkyl imine substituted at about 80% of the available nitrogens. The security component in this ink jet composition causes the ink to maintain color when subjected to bleach to prevent alteration of a printed document, and can be used in ink jet printers.

Other objects and advantages of the invention will be apparent from the following description and the appended claims.

DETAILED DESCRIPTION OF THE INVENTION

Before inks are approved for printing lottery tickets, they must pass stringent security requirement tests. Since bleach is a powerful tool used to decolorize most inks due to its ability to attack the dye molecule and oxidize it into small colorless fragments, resistance to bleach tops the list of these security requirements.

In a typical bleach test, a drop of full strength household bleach is deposited on the printed numbers on the lottery ticket and is left undisturbed for approximately 45 minutes. At the end of this time, the numbers must remain legible in order to discourage any attempts of falsifying a lottery ticket. Most of the dyes used in formulating inks for ink-jet printers break down with bleach to form colorless components, and as a result the print totally disappear.

In accordance with the present invention, the addition of a soluble form of benzothiazole which is commercially available as Intrassist Stain #10 from Crompton & Knowles Corp., to waterfast ink such as is described and claimed, for example, in commonly assigned co-pending application Ser. No. 08/204,479, the disclosure of which is totally incorporated herein by reference, has solved the bleach resistance problem of lottery ticket inks. The percentage needed of this material in inks varies between 0.3% and 3.0% by weight. When prints made with these treated inks were tested with household bleach as mentioned above, the numbers remained visible long after the original ink color bleached out.

The waterfast security ink jet ink composition of the present invention comprises a security component, a liquid vehicle, a dye, and an N-hydroxyalkyl imine substituted at about 80% of the available nitrogens. The N-hydroxyalkyl imine is preferably selected from the group consisting of branched polyethyleneimine polymer. The N-hydroxyalkyl is preferably selected from the group consisting of N-hydroxyethyl and N-hydroxypropyl. In a preferred embodiment, the polymer has a molecular weight range of approximately 40,000 to 60,000, and a preferred molecular weight of approximately 50,000.

The liquid vehicle in the ink jet ink composition of the present invention comprises an amine, preferably alkyl- and alkanol-substituted amines such as dimethylethanolamine, triethanolamine, diethylethanolamine and the like. Other additives that are optionally included in the vehicle of the invention include a corrosion inhibitor in an amount from 0 to 0.2 wt. % such as an alkanolamine; and a wetting agent of from 0 to 1 wt. %, such as an ethoxylated glycol ether; and a biocide from 0 to 0.5 wt. % such as dehydroacetic acid. The ink may also include an optional defoamer such as phosphate esters, silicone or non-silicone defoamer or acetylenic diol.

The dye in the ink jet ink composition of the present invention is water soluble and preferably selected from the group consisting of direct dyes, acid dyes and food dyes. In general, the concentration of the dye should be between about 2% and 4% by weight.

The security component in the ink jet ink composition of the present invention is a water soluble form of benzothiazole, which is commercially available as Intrassist Stain #10 from Crompton & Knowles Corporation. When ink is formulated according to Example I, without the security component, and subjected to household bleach, the ink disappears entirely in approximately 5–10 minutes. Ink formulated in accordance with Example I, although satisfying the waterfastness requirement for printing lottery tickets, cannot be approved for printing lottery tickets because of its lack of resistance to bleach.

Example I

| Component | Weight % |
| --- | --- |
| Direct Black 19 dye | 3 |
| Triethanolamine | 1 |
| 80% Hydroxyethyl Polyethyleneimine M. wt. 50,000 | 3 |
| Surfynol 104 E Wetting Agent | 0.5 |
| 1,2-Benzisothiazoline-3-one biocide | 0.1 |
| Deionized water | Balance |

In order to be approved for printing lottery tickets, the present invention introduces a security component in the ink. An ink made in accordance with the present invention may be manufactured as follows:

PREPARATION OF INK

EXAMPLE II

The following is one embodiment of an ink prepared in accordance with the present invention.

| Component | Weight % |
| --- | --- |
| Direct Black 19 dye | 3 |
| Triethanolamine | 1 |
| 80% Hydroxyethyl Polyethyleneimine M. wt. 50,000 | 3 |
| Surfynol 104 E Wetting Agent | 0.5 |
| 1,2-Benzisothiazoline-3-one biocide | 0.1 |
| Intrassist Stain #10 | 2.5 |
| Deionized water | Balance |

When the ink composition was formulated as above in accordance with the present invention, the ink was used in a continuous ink jet printer, such as the type manufactured by Scitex Digital Printing, Inc., in Dayton, Ohio, to test its reaction to a typical bleach test. When the prints generated using the ink formulated in accordance herewith were subjected to household bleach by placing drops of the bleach on the printed numbers, the black color of the prints were soon replaced by strong bright orange color which remained unaffected when soaked in water for one minute.

EXAMPLE III

In a second embodiment of an ink prepared in accordance with the present invention, 0.75 wt. % of the Intrassist Stain #10 was substituted for the 2.5 wt. % in Example II:

| Component | Weight % |
| --- | --- |
| Direct Black 19 dye | 3 |
| Triethanolamine | 1 |
| 80% Hydroxyethyl Polyethyleneimine M. wt. 50,000 | 3 |
| Surfynol 104 E Wetting Agent | 0.5 |
| 1,2-Benzisothiazoline-3-one biocide | 0.1 |
| Intrassist Stain #10 | 0.75 |
| Deionized water | Balance |

Even when only 0.75 wt. % of the security component was used, in place of the 2.5 wt. %, the resulting print retained a light yellowish stain after subjecting the prints to bleach as stated in Example II, which is still adequate to prevent alteration of a printed document.

EXAMPLE IV

In a third embodiment of an ink prepared in accordance with the present invention, 0.25 wt % of the Intrassist Stain #10 was substituted for the 2.5 wt. % in Example II.

| Component | Weight % |
| --- | --- |
| Direct Black 19 dye | 3 |
| Triethanolamine | 1 |
| 80% Hydroxyethyl Polyethyleneimine M. wt. 50,000 | 3 |
| Surfynol 104 E Wetting Agent | 0.5 |
| 1,2-Benzisothiazoline-3-one biocide | 0.1 |
| Intrassist Stain #10 | 0.25 |
| Deionized water | Balance |

Prints generated using the ink formulated in accordance with Example IV showed a faint yellow stain upon exposure to bleach. However, the color disappeared in minutes, failing the bleach security test.

As will be obvious to anyone skilled in the art, the ingredients in all three examples above are commercially available. It is also understood and known in the art that waterfastness is dye specific, resulting in variations in the amount of waterfastness achieved. The ink composition of the present invention is particularly adaptable for incorporation into an ink jet printing apparatus for forming images by causing the ink to be expelled in droplets onto a substrate, thereby generating an image on the substrate.

In accordance with a preferred embodiment of the present invention, the waterfast security inks are formulated for use in ink jet printers. The preferred ink jet ink composition comprises a security component, a liquid vehicle, a dye, and a branched N-hydroxyalkyl polyethyleneimine polymer or N-hydroxyalkyl diphenylguanidine substituted at about 80% of the available nitrogens. The security component in this ink jet composition causes the ink to maintain color after being subjected to bleach, and, therefore, can be used to formulate waterfast security inks for ink jet printers.

Industrial Applicability and Advantages

The present invention is useful in the field of ink jet printing, and has the advantage of formulating a waterfast security ink for use in ink jet printing ink which leaves a visible stain behind after the print is treated with household bleach. Since the preferred security component, Intrassist Stain #10, in the ink jet ink of the present invention, is water soluble, the ink of the present invention has the further advantage of allowing for the formulation of aqueous inks free of any potentially hazardous solvents such as cellosolves and the like.

The invention has been described in detail with particular reference to certain preferred embodiments thereof, but it will be understood that modifications and variations can be effected within the spirit and scope of the invention.

We claim:

1. An ink jet ink composition comprising a security component present in an amount from about 0.3 to about 3 percent by weight, a liquid vehicle, a dye, and an N-hydroxyalkyl imine substituted at about 80% of the available nitrogens present in an amount of approximately 3 percent by weight.

2. An ink jet ink composition as claimed in claim 1 wherein the security component comprises a water soluble form of benzothiazole.

3. An ink jet ink composition as claimed in claim 1 wherein the N-hydroxyalkyl imine substituted at about 80% of the available nitrogens comprises a branched polyethyleneimine polymer.

4. An ink jet ink composition as claimed in claim 1 wherein the dye is water soluble and selected from the group consisting of direct dyes, acid dyes and food dyes.

5. A process for generating images which comprises incorporating into an ink jet printing apparatus the ink composition of claim 1 and forming images by causing the ink to be expelled in droplets onto a substrate, thereby generating an image on the substrate.

6. A process as claimed in claim 5 wherein the ink contains a security component comprising a water soluble form of benzothiazole.

7. A process as claimed in claim 5 wherein the N-hydroxyalkyl imine substituted at about 80% of the available nitrogens comprises a branched polyethyleneimine polymer.

8. A process as claimed in claim 5 wherein the security component is present in an amount from about 0.3 to about 3 percent by weight.

9. A process as claimed in claim 5 wherein the N-hydroxyalkyl imine substituted at about 80% of the available nitrogens is present in an amount of about 3 percent by weight.

10. A process as claimed in claim 5 wherein the image is generated by a continuous stream ink jet printing process.

11. An ink jet composition as claimed in claim 1 wherein the liquid vehicle is selected from the group consisting of a wetting agent, a biocide, a corrosion inhibitor, deionized water, and mixtures thereof.

12. An ink jet composition as claimed in claim 1 further comprising a defoamer.

* * * * *